United States Patent
Desseroir et al.

(10) Patent No.: US 9,546,111 B2
(45) Date of Patent: Jan. 17, 2017

(54) DISPERSING POLYMERS WITH IMPROVED THERMAL STABILITY

(75) Inventors: Alexandre Desseroir, Sainville (FR); Philippe Maitrasse, Chilleurs aux Bois (FR); Marc Lemaire, Villeurbanne (FR); Florence Popowycz, Villeurbanne (FR); Pierre Labourt-Ibarre, Lyons (FR)

(73) Assignee: CHRYSO, Issy Les Moulineaux (FR)

( * ) Notice: Subject to any disclaimer, the term of this patent is extended or adjusted under 35 U.S.C. 154(b) by 57 days.

(21) Appl. No.: 14/238,190

(22) PCT Filed: Aug. 9, 2012

(86) PCT No.: PCT/EP2012/065581
§ 371 (c)(1),
(2), (4) Date: Apr. 2, 2014

(87) PCT Pub. No.: WO2013/021029
PCT Pub. Date: Feb. 14, 2013

(65) Prior Publication Data
US 2015/0148455 A1 May 28, 2015

(30) Foreign Application Priority Data
Aug. 11, 2011 (FR) ...................................... 11 57306

(51) Int. Cl.
*C08F 120/06* (2006.01)
*C04B 24/26* (2006.01)
(Continued)

(52) U.S. Cl.
CPC ....... *C04B 24/2647* (2013.01); *C04B 24/2658* (2013.01); *C08F 8/14* (2013.01);
(Continued)

(58) Field of Classification Search
CPC ............. C04B 24/2658; C04B 24/2647; C04B 2103/408
See application file for complete search history.

(56) References Cited

U.S. PATENT DOCUMENTS 4,956,410 A * 9/1990 Scottt ................... C08F 255/02
523/351
7,323,511 B2 * 1/2008 Cholli ...................... A23G 3/36
524/611
(Continued)

FOREIGN PATENT DOCUMENTS

EP 1 124 892 B1 9/2004
FR 2 900 930 A1 11/2007
(Continued)

*Primary Examiner* — Ling Choi
*Assistant Examiner* — Lanee Reuther
(74) *Attorney, Agent, or Firm* — Knobbe, Martens, Olson & Bear, LLP

(57) ABSTRACT

The invention relates mainly to a polymer comprising a hydrocarbon-based main chain bearing carboxylic groups and polyalkoxylated chains and up to 4% by weight of anti-oxidant groups, relative to the weight of the final polymer, grafted to the main chain. It also relates to a method for preparing such a polymer and to an admixture which is of use as a plasticizer of suspensions of mineral particles comprising same. Finally, it is related to the use of such a polymer for fluidifying suspensions of mineral particles and reducing the water demand of hydraulic compositions.

25 Claims, 2 Drawing Sheets

Figure 1:
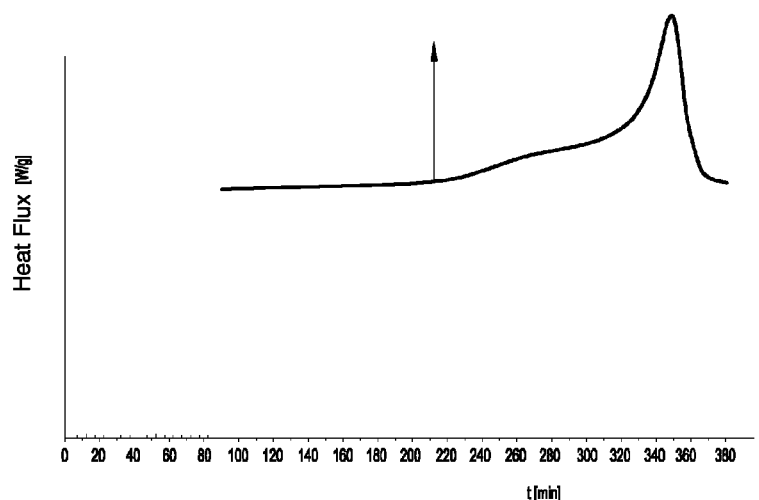

(51) Int. Cl.
  *C08G 81/02* (2006.01)
  *C08J 3/21* (2006.01)
  *C08F 8/14* (2006.01)
  *C08F 8/30* (2006.01)
  *C08F 8/32* (2006.01)
  *C08J 3/12* (2006.01)
  C08K 5/00 (2006.01)
  C04B 103/00 (2006.01)
  C04B 103/40 (2006.01)
  C04B 103/52 (2006.01)
  C08F 220/28 (2006.01)
  C08K 5/18 (2006.01)

(52) U.S. Cl.
  CPC ............... *C08F 8/30* (2013.01); *C08F 8/32* (2013.01); *C08F 120/06* (2013.01); *C08G 81/025* (2013.01); *C08J 3/12* (2013.01); *C08J 3/21* (2013.01); C04B 2103/006 (2013.01); C04B 2103/408 (2013.01); C04B 2103/52 (2013.01); *C08F 2220/285* (2013.01); *C08J 2333/02* (2013.01); *C08J 2333/04* (2013.01); *C08J 2333/06* (2013.01); *C08K 5/005* (2013.01); *C08K 5/18* (2013.01)

(56) References Cited

U.S. PATENT DOCUMENTS

2009/0182061 A1  7/2009  Moro et al.
2012/0136096 A1* 5/2012  Naranjo ............... C04B 28/02
                                                 524/5

FOREIGN PATENT DOCUMENTS

FR  WO 2011015761 A1 *  2/2011  ............ C04B 28/02
WO  WO 2009/090471 A1    7/2009
WO  WO 2011/015761 A1    2/2011

* cited by examiner

DISPERSING POLYMERS WITH IMPROVED THERMAL STABILITY

TECHNICAL FIELD

The present invention relates to the field of polymers useful in particular as plasticizers for aqueous suspensions of mineral particles, in particular hydraulic binders, to a method for their preparation, to the polymers which may thereby be obtained, to the admixture formulated from these polymers and to their use.

STATE OF THE ART

The discovery of exceptional plasticizer properties of comb polymers of the polyalkoxylated polycarboxylate (PCP) type has allowed application of screeds, mortars, self-smoothing coatings and concretes based on increasingly performing hydraulic binders.

The use of these plasticizer polymers may prove to be delicate because of their low resistance towards heat and oxidizing media. In particular, the chains of poly(alkylene oxide) tend to degrade by oxidation when they are exposed to high temperatures and/or to an oxidizing atmosphere. The degradation of the polymer affects its plasticizer performances.

Thus, the low heat resistance of plasticizer polymers may pose problems when they are powdered, by drying at a temperature, from the polymeric aqueous solution: degradation of the polymer, or even under certain conditions a risk of explosion of the polymer powder. The limitation of the degradation of the polymer imposes extensive precautions such as placing them under an inert gas, $CO_2$ or nitrogen, of the atomizing tower.

Further, these powders of plasticizer polymers have to meet the requirements for obtaining the <<transport class>>. This classification, provided by the European Convention on Transport of Dangerous Materials by Road (ADR) notably requires low self-heating, characterized by the fact that a cubic sample with a side length of 100 mm has a powder temperature of less than 200° C. after exposure to a temperature of 140° C. for 24 hours.

The low heat resistance of these plasticizer polymers may also impose particular constraints for their storage. Indeed, a loss of performance may be observed after extended storage of powdered polymers in a hangar where the temperature may reach 50° C. over several weeks in summer.

Finally, the low thermal resistance limits the possibilities of use of plasticizer polymers. Thus, it is presently sought to add the plasticizer as soon as during the milling of the hydraulic binders, notably of the cement, which is impossible with a conventional plasticizer polymer which does not resist to the high temperatures and oxidizing conditions encountered during this manufacturing step.

Several solutions have been proposed in order to improve the thermal stability of plasticizer polymers of the polycarboxylate polyalkoxylate type and/or their resistance in an oxidizing atmosphere.

From EP 1 124 892, it is thus known how to stabilize powders of polymers of the polyalkoxylated polycarboxylate type by adding to the aqueous solution of these polymers, anti-oxidant agents selected from phenols, amines, phosphites, thioethers and thioacids, before drying. As these agents are generally liquid and hydrophobic, they have to be incorporated by emulsification.

Because of their relative stability, these emulsions may pose specific problems during drying. Thus, the instability of the emulsions, notably in the presence of customary additives of the silica type, renders the management of the method delicate. The formation of deposits on the walls of the atomizing tower is observed, which affects the quality and the yield of the method. The instability of the emulsions moreover does not always give the possibility of ensuring homogeneous distribution of the anti-oxidant agent within the polymer powder. Moreover, losses of stabilizer by draining away with water during drying cannot be excluded. The whole of these phenomena causes risks of heating, or even explosion, of the partly poorly protected powder.

From WO 2011/015761, associating a plasticizer with an anti-oxidant agent, as a sacrificial agent, is also known in order to limit the degradation of the polymer in an oxidizing medium, for example during the milling of the cement. Integration of certain sacrificial agents into the backbone of the plasticizer by copolymerization, notably radical copolymerization, is also contemplated. This method generates substantial costs since it requires a content of at least 5% by weight of sacrificial agents in the plasticizer composition. Indeed, the proposed operating procedure seems to be difficult to carry out on an industrial scale.

Generally, it is further observed that the plasticizer formulations frequently change over time, notably by phenomena such as precipitation, coloration, viscosification, creaming, demixing, or Ostwald ripening.

Moreover, patent application WO 2009/090471 proposes protection of a polycarboxylic polymer during the esterification step by adding anti-oxidant agents, notably an aromatic amine. These anti-oxidant agents are not intended to be integrated into the polymer and this moreover seems to be difficult taking into account the reactivity of the described agents. Moreover, it was observed that the method resulted in the obtaining of emulsions.

SUMMARY OF THE INVENTION

The object of the invention is then to propose plasticizer polymers of the polyalkoxylated polycarboxylate type having improved stability towards heat and/or in an oxidizing medium and without the drawbacks mentioned.

This object is achieved according to the invention by a polymer in which the anti-oxidant groups are introduced into the PCP polymer by a grafting reaction. The distribution is then homogeneous on the scale of the polymer chain, thereby giving it improved overall thermal stabilization.

The powdering of these polymers by atomization from their aqueous solution may then be carried out without any risk. The thereby obtained powder may be classified as <<stable during transport>>. In addition to their excellent thermal resistance, polymers with anti-oxidant groups according to the invention keep the same dispersing efficiency.

Also, the invention according to a first aspect is directed to a polymer comprising a main hydrocarbon chain bearing carboxylic groups and polyalkoxylated chains and 0.01 to 4% by weight of anti-oxidant groups grafted to the main chain, based on the weight of the final polymer.

Preferably, the anti-oxidant groups comprise an aromatic amine, notably an amine bearing two aromatic substituents, moreover bearing a reactive function allowing grafting, such as 4-aminodiphenylamine.

A group stemming from an anti-oxidant compound of the following formula (I) is particularly preferred:

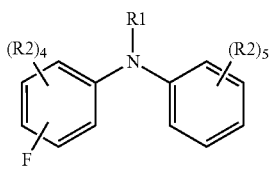

wherein:

R1 is a hydrogen or a saturated or unsaturated, linear or branched, hydrocarbon chain or one or more aromatic optionally fused rings, comprising from 1 to 100 carbon atoms optionally interrupted by one or more heteroatoms such as O, S, N or P; preferably R1 is a hydrogen;

R2 is identical or different and may, independently of each other, be a hydrogen or a saturated or unsaturated, linear or branched, hydrocarbon chain, or one or more aromatic optionally fused rings, comprising from 1 to 100 carbon atoms, optionally interrupted with one or more heteroatoms such as O, S, N or P, and/or optionally substituted with one or more amine, alcohol, ketone, halogenated derivative, isocyanate, acetoacetonate, silanol, carboxylic acid and alcohol ester, epoxide, carbonate or mercaptan, phosphate, phosphonate, sulfate, sulfonate or carboxylate groups; preferably R2 is a hydrogen;

F is an amine group, notably a primary amine group, an alcohol, ketone, halogenated derivative, isocyanate, acetoacetonate, silanol, carboxylic acid and alcohol ester, epoxide, carbonate or mercaptan group bound to the aromatic ring optionally through a saturated or unsaturated, linear or branched, hydrocarbon chain including up to 100 carbon atoms; preferably F is a primary amine group.

The anti-oxidant compound is grafted on the polymer by reaction of the reactive function F with a reactive function of the PCP polymer. Advantageously, the anti-oxidant group may notably be grafted on the main chain via a carboxylic group, by means of an amide or ester bond. The anti-oxidant group may however be also grafted through any other type of covalent bond.

The grafted polymer according to the invention preferably has a weight average molar mass (Mw) comprised between 1,000 and 1,000,000, preferably between 5,000 and 110,000.

According to a preferred order, the polymer is in the form of powder.

Advantageously, it includes between 0.1 and 4% by weight of anti-oxidant groups, based on the weight of the polymer.

According to a second aspect, the invention is directed to a method for preparing a polymer comprising the step of:

(i) esterifying a polycarboxylic compound with an alkoxy polyalkoxyglycol in the presence of an anti-oxidant compound which may react, under conditions of the reaction, with a reactive function borne by the polycarboxylic compound in order to form a covalent bond between the polycarboxylic compound and the anti-oxidant compound.

Preferably, step (i) is carried out in two distinct steps:

(a) the reaction medium is first brought to a temperature comprised between 50 and 95° C. and under reduced pressure;

(b) the reaction is then continued by heating to a temperature comprised between 100 and 200° C. under reduced pressure and/or under a flow of inert gas until the end of the reaction.

Moreover, the method may further comprise a step for powdering the obtained grafted polymer.

The powdering step may then be directly carried out from the polymer stemming from step (b). Alternatively, it may also be carried out by carrying out the steps of:

putting the obtained grafted polymer into an aqueous solution; and powdering the obtained polymer solution, notably by atomization, flaking with a thin film on a drum or milling.

According to a third aspect, the invention is also directed to a polymer which may be obtained by the described method. Preferably, this is such a polymer according to the invention in the form of a notably aqueous solution or in the form of a powder.

According to a fourth aspect, the invention is directed to an admixture useful as a plasticizer of suspensions of mineral particles, comprising the polymer according to the invention.

Preferably, the admixture according to the invention appears as a limpid aqueous solution. It advantageously includes 10 to 50% by weight of polymer as well as, if necessary, additives which are customary in this matter.

According to a fifth aspect, the invention is finally directed to the use of a described grafted polymer for fluidifying suspensions of mineral particles.

According to a last aspect, the invention is directed to the use of a grafted polymer as described for reducing the water demand of hydraulic compositions, notably cement compositions.

It is particularly directed to this last use in which the polymer is added in liquid and/or powder form before and/or during milling of the cement.

DETAILED DESCRIPTION OF THE INVENTION

Within the scope of the present discussion, the term of <<solution>> is meant to cover essentially monophasic liquid formulations. Preferably, these are limpid solutions, as demonstrated by turbidity measurements carried out by means of a TUB 550 IR turbidimeter of the WTW brand of less than 1,000, preferably less than 100 and most particularly less than 50 or even 10. Aqueous solutions are particularly targeted, although they may also include minority amounts of other solvents.

By the term of <<grafting>> is meant the modification of a polymer by reaction with a compound different from the monomers making up the initial polymer. At the end of the grafting reaction, the grafted compound is bound to the polymer through a covalent bond, forming a side group. The existence of a grafted reaction may be demonstrated by the impossibility of recovering from the reaction mixture the grafted compound by physical separation means such as extraction with a solvent. The grafting of the polymer may also be demonstrated by the detection of the thereby formed amide, ester or other bonds, for example by the appearance of absorption bands in the respective regions in infrared spectroscopy (IR).

By the term of <<suspension of mineral particles>> is meant any aqueous dispersion of a hydraulic setting binder, notably of cements such as Portland cement (CEM I and cements with additions as defined by the EN-197-1 standard), aluminous cements, calcium sulfates either anhydrous or semihydrates, addition materials with a hydraulic or pozzolanic nature such as slags (as defined in the Cement standard NF EN 197-1 paragraph 5.2.2), for example from blast furnaces, flying ashes (as defined in the Cement standard NF EN 197-1, paragraph 5.2.4), natural pozzolans, calcined shales (as defined in the Cement standard NF EN 197-1 paragraph 5.2.5), limestones (as defined in the Cement standard NF EN 197-1, paragraph 5.2.6) or further silica fumes (as defined in the Cement standard NF EN 197-1, paragraph 5.2.7) or mixtures thereof. Other additions, not presently recognized by the Cement standard NF EN 197-1 (2001), may also be used. These are notably metakaolins, such as metakaolins of type A according to the NF P 18-513 standard, and siliceous additions such as siliceous additions of Qz mineralogy according to the NF P 18-509 standard.

The term also encompasses inert mineral fillers such as granulates, sands, calcium sulfate dihydrates as well as calcium carbonates, or further lime hydrate, silica, titanium hydroxide, clay compounds and metal oxides.

More particularly, by the term of <<suspension of mineral particles>> is meant any aqueous dispersion of a hydraulic setting binder, notably of cements such as Portland Cements (CEM I and cements with additions as defined by the E-197-1 standard), aluminous cements, calcium sulfates either anhydrous or semihydrates, addition materials with a hydraulic or pozzolanic nature such as blast furnace slags, flying ashes, natural pozzolans. The term also encompasses inert mineral fillers such as granulates, sands, calcium sulfate dihydrates as well as calcium carbonates, or further lime hydrate, silica, titanium hydroxide, clay compounds and metal oxides.

By the term of <<hydrocarbon chain>> is meant a linear or branched aryl alkyl or alkyl aryl, aromatic, saturated or unsaturated, linear or branched aliphatic group including carbon and hydrogen atoms. Within the scope of the present invention, the hydrocarbon chain is preferably a saturated linear aliphatic chain.

By the term of <<anti-oxidant group>> is meant any group capable when it is present in lower concentrations than those of the units of the polymer, of being oxidized, of significantly slowing down, or even preventing their oxidation (see Handbook of Anti-oxidants, Second Edition by Lester Packer, Marcel Dekker, 2002, p [4]). Within the scope of this discussion it will be considered that an oxidation is slowed down when the induction time, measured by differential scanning calorimetry (DSC) as explained later on, increases by at least 100%, preferably 300%, and most particularly 500% or more as compared with the same polymer without anti-oxidant agent.

Preferably, these are groups resulting from the grafting of anti-oxidant compounds comprising an amine, alcohol or phenol function and most particularly aromatic amines of formula I as defined earlier.

By the term of <<polycarboxylic compound>>, is meant a polymer or copolymer bearing several carboxylic functions such as carboxylic acid, carboxylic anhydride, and/or optionally other reactive functions such as an amine, alcohol, ketone, halogenated derivative, isocyanate, acetoacetonate, silanol, carboxylic acid and alcohol ester, epoxide, carbonate or mercaptan group.

According to a first aspect, the invention is directed to a polymer comprising a main hydrocarbon chain bearing carboxylic groups and polyalkoxylated chains, characterized in that it includes from 0.01 to 4% by weight of anti-oxidant groups grafted to the main chain, based on the weight of the final polymer.

The polymers according to the invention are derived from polymers said to be <<comb polymers>> including a main hydrocarbon chain on the one hand and side groups on the other hand. More specifically, these are polyalkoxylated polycarboxylates, so-called <<PCPs>>, which are charac-terized by the presence on the main chain of carboxylic groups and of polyoxylated groups as side groups. Additionally, the polymer according to the invention bears anti-oxidant groups as side groups. In their most broad definition, the polymers according to the invention are therefore polymers of the PCP type modified by grafting of anti-oxidant groups.

The simultaneous presence of the three types of groups gives the polymer according to the invention interesting properties as an admixture, notably as a plasticizer for hydraulic compositions.

Subject to not interfering in an unfavorable way with the hydration reaction of the hydraulic composition and of course to not slowing down the oxidation reactions, the anti-oxidant groups may be of very diverse nature.

In particular these may be groups stemming from amines, in particular aromatic amines. It is more preferred that the anti-oxidant groups be sterically hindered groups. Also notably amines bearing two aromatic substituents are preferred.

Preferably, the anti-oxidant compounds used for modifying the polymer fit the following formula (I):

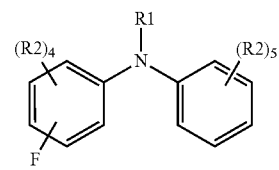

wherein:

R1 is a hydrogen or a saturated or unsaturated, linear or branched hydrocarbon chain, or one or more aromatic optionally fused rings, comprising from 1 to 100 carbon atoms optionally interrupted with one or more heteroatoms such as O, S, N or P; preferably R1 is a hydrogen;

R2 is identical or different and may, independently of each other, be a hydrogen or a saturated or unsaturated, linear or branched hydrocarbon chain, or one or more aromatic optionally fused rings, comprising from 1 to 100 carbon atoms, optionally interrupted with one or more heteroatoms such as O, S, N or P, and/or optionally substituted with one or more amine, alcohol, ketone, halogenated derivative, isocyanate, acetoacetonate, silanol, carboxylic acid and alcohol ester, epoxide, carbonate or mercaptan, phosphate, phosphonate, sulfate, sulfonate or carboxylate groups; preferably R2 is a hydrogen;

F is an amine group, notably a primary amine, alcohol, ketone, halogenated derivative, isocyanate, acetoacetonate, silanol, carboxylic acid and alcohol ester, epoxide, carbonate or mercaptan group bound to the aromatic ring optionally through a saturated or unsaturated, linear or branched hydrocarbon chain including up to 100 carbon atoms; preferably F is a primary amine group.

Preferably, the anti-oxidant compound is an aromatic amine bearing a reactive function with a carboxylic function, for example a primary amine or alcohol group. Amines derived from diphenylamine such as 4-aminodiphenylamine (ADPA), p-amino-4-methyl-diphenylamine, p-amino-4'-ethoxy-diphenylamine, p-amino-4'-methoxy-diphenylamine and p-amino-4'-(N,N-dimethylamino)-diphenylamines are particularly preferred. 4-aminodiphenylamine (ADPA) is most preferred.

The proportion of the anti-oxidant groups in the polymer according to the invention may greatly vary. As this will be shown in the following, a proportion of 0.5% by weight based on the weight of the polymer already allows a notable improvement in the heat resistance of the polymer.

It was observed that the resistance is even further pronounced when the polymer includes a proportion of 1 to 2% by weight. Although the presence of anti-oxidant groups beyond 5, or even beyond 4% by weight does not necessarily interfere with the anti-oxidant effect, it is not desirable, notably in order to maintain the economical nature and the application properties of the product.

Also, the polymers according to the invention comprise 0.01 to 5% and preferably 0.01 to 4%, and in particular between 0.1 and 4% by mass of anti-oxidant groups.

The polymer according to the invention also includes as side groups, polyoxyalkylated chains. These polyoxyalkylated chains may be bound to the main chain directly or via carboxylic functions, notably through an ester bond.

These carboxylic groups may notably be in the form of a non-dissociated acid or acid anhydride. Most often, they will however be at least partly neutralized, esterified or amidified.

The molar proportion of the free carboxylic groups in the polymer may vary from 0 to 99%, in particular from 40 to 97%.

The grafted polymer according to the invention generally has an average molar mass comprised between 1,000 and 1,000,000 (Mw), preferably between 5,000 and 110,000 (Mw) as determined by SEC (size exclusion chromatography) in polyoxyethylene standard equivalents.

According to a second aspect, the invention proposes a method for preparing the polymer including anti-oxidant groups as described above.

According to a preferred embodiment of the invention, the polymer is prepared by an esterification method, from prepolymers, said to be a <<post-grafting>> method. The anti-oxidant agent is also introduced into the esterification step.

Preferably, the anti-oxidant groups are introduced with the polyoxyalkylated chains during a single step, in what is designated as a <<one pot reaction>>, thus making any intermediate isolation step unnecessary. The method may thus be conducted rapidly and inexpensively.

The grafting is preferably achieved by reaction of the reactive functions of the polymer, notably the carboxylic groups, with an anti-oxidant compound bearing a reactive function, notably an alcohol or primary or secondary amine group.

The anti-oxidant groups are preferably bound to the polymer by means of an amide or ester function.

Also, the invention is directed to a method for preparing the polymer described above comprising the step of:

(i) esterifying a polycarboxylic compound with an alkoxy polyalkoxyglycol in the presence of an anti-oxidant compound which may react under the conditions of the reaction with a reactive function borne by the polycarboxylic compound in order to form a covalent bond between the polycarboxylic compound and the anti-oxidant compound.

The pH of the reaction mixture is advantageously weakly acid, preferably comprised between 4 and 6.

The polycarboxylic acid may be a polymer including identical or different carboxylic units. This is preferably a polyacrylic or polymethacrylic acid. The weight molar mass Mw of the polycarboxylic is preferably comprised between 500 and 10,000.

The alkoxy polyalkoxyglycol preferably includes ethylene oxide and optionally propylene oxide units. Several different glycols may be used advantageously. The weight molar mass Mw of the glycol is preferably comprised between 150 and 10,000.

Preferably, the polycarboxylic acid is not entirely esterified. Also, most often an amount of glycol of less than the one required for ensuring complete esterification of the polymer, for example 1 to 40% of the number of carboxylic functions of the polymer, will be added.

Broadly, the anti-oxidant compound may be defined as comprising an anti-oxidant group and a reactive function which may react with one of the functions of the polymer, notably a carboxylic group, so as to thereby allow grafting. For example, an anti-oxidant compound may bear a primary amine or alcohol function which, as a reactive function, will allow grafting on the polymer by reaction with carboxylic functions of the polymer.

However, other assumptions may be contemplated, such as for example the main hydrocarbon chain of the polymer may bear reactive functions of the amine, alcohol, ketone, halogenated derivative, isocyanate, acetoacetonate, silanol, carboxylic acid and alcohol ester, epoxide, carbonate or mercaptan type which may react with similar functions borne by the anti-oxidant agent.

The main hydrocarbon chain of the grafted polymer will therefore be connected to the anti-oxidant group through covalent bonds of different nature, such as:

An amide bond: reaction between an amine and a carboxylic acid and/or carboxylic acid anhydride and/or acid and alcohol ester An imide bond: reaction between an amine and a carboxylic acid anhydride A carboxylic ester bond: reaction between an alcohol and a carboxylic acid and/or carboxylic acid anhydride A thioester bond: reaction between a mercaptan and a carboxylic anhydride An ether bond: reaction between a halogenated derivative and an alcohol; reaction between an alcohol and an epoxide A sulfide bond: reaction between a mercaptan and an epoxide, reaction between a mercaptan and a halogenated derivative A urea bond: reaction between an amine and an isocyanate A urethane bond: reaction between an alcohol and an isocyanate; reaction between a carbonate and an amine A mixed carbonate bond: reaction between an alcohol and a carbonate An amine II and/or III bond: reaction between an amine I and a halogenated derivative An imine bond: reaction between a ketone and an amine I A ketoamide bond: reaction between an amine and an acetoacetonate The amount of anti-oxidant compound introduced into the reaction mixture will depend on the desired grafting level. Advantageously, less than 5% and preferably less than 4% by weight based on the dry weight of polymer will be added.

Preferably, the method according to the invention is conducted so as to carry out steps (i) in two distinct steps:

(a) the reaction mixture is first brought to a temperature comprised between 50 and 95° C. and under reduced pressure;

(b) the reaction is then continued by heating to a temperature comprised between 100 and 200° C. under reduced pressure until the end of the reaction.

Alternatively, the carboxylic monomer may be polymerized and the carboxylic groups may then be esterified to the desired degree with polyoxyalkylated compounds, as this is described for example in patent application FR 2 776 285, before grafting the obtained product with an anti-oxidant compound.

Preferably, the anti-oxidant compound is an alcohol or an amine bearing an anti-oxidant group, the amines being preferred because of their better reactivity at low temperature.

The grafting reaction may be advantageously carried out at a temperature above 120° C., preferably between 150 and 200° C., and in particular between 170 and 180° C. The water formed by the reaction is then removed from the reaction mixture by evaporation, and the reaction product is recovered as a dry residue.

The carboxylic groups possibly present in the reaction product may then be totally or partly neutralized.

According to a preferred embodiment, the polymer according to the invention appears as a powder.

Preferably, the powdering is carried out from the polymer in a solution. Because of the increased thermal stability of the polymer according to the invention, the powdering may be achieved with a customary and economical technique such as atomization in air, flaking, for example by means of a thin film drying technique, from the polymer solution. However, the polymer may also be powdered directly at the end of the synthesis, for example by milling the molten and then cooled anhydrous polymer.

Also, according to a third aspect, the invention is directed to a polymer with an anti-oxidant group which may be obtained by the method, object of the invention.

The polymers according to the invention may be used as such. However they are advantageously powdered or formulated before use in order to facilitate transport, storage and dosage. According to a more preferred embodiment, the polymer according to the invention is found as a powder.

According to a fourth aspect, the invention proposes an admixture for suspensions of mineral particles comprising the described polymer with anti-oxidant groups.

In order to facilitate the application and dosage thereof, the admixture may be present in the form of a solution in a suitable solvent. Indeed, by incorporating the anti-oxidant functions into the polymer, there are no longer any problems of solubilization of the anti-oxidant, the polymer protected against oxidation is soluble and may therefore be easily formulated as a solution. One is no longer confronted with segregation, sedimentation or flocculation problems observed with emulsions, and storage is easy.

Preferably, the suitable solvent comprises or consists of water. In certain cases, the addition of another solvent, such as an alcohol or a glycol may be contemplated additionally or alternatively, for example for facilitating solubilization.

The polymer concentration of the admixture mainly depends on the contemplated application. Generally, the formulation of the admixture comprises 1 to 50, preferably 10 to 40% by weight of polymer based on the total weight.

By the grafting of the anti-oxidant groups, the polymer according to the invention is most often water-soluble and forms limpid solutions which are stable over time.

Alternatively, the admixture may also be present in a dry form, notably as a powder. The powder is made either directly from the dry polymer obtained at the end of the synthesis, or from the polymer put into a solution.

Various technologies for powdering the anhydrous polymer may be used such as tabletting and subsequent milling or flaking and subsequent milling or further spraying by cooling the anhydrous molten polymer (spray cooling).

Various powdering technologies from the polymer in solution may be used such as atomization, flaking with a thin film on a drum and milling. Generally, the powdering of polymers from a solution is better controlled technically and often consequently justified the additional prior step of putting the polymer in solution.

The formulation of the admixture may moreover comprise other customary additives, such as anti-foam agents, accelerators, retardants, water-repellent agents, de-aerating agents, other plasticizers, air-entraining agents or anti-foam agent stabilizers.

Also, the invention according to a fifth aspect proposes the use of the polymer described above for fluidifying a suspension of mineral particles and for maintaining the workability of the suspensions.

As suspensions of mineral particles, mention may in particular be made of cement compositions, and notably concretes, notably prefabricated concretes and ready-to-use concretes.

Moreover, with the heat resistance of the polymers according to the invention, it is possible to contemplate the preparation of hydraulic binders with admixtures, notably cement binders in a dry form. These binders have reduced water demand because of the dispersing action of the polymer according to the invention.

According to a last aspect, the invention is therefore directed to the use of a polymer according to the invention for reducing the water demand of hydraulic compositions.

The amount of admixture to be added to the suspension of mineral particles of course depends on the sought properties and on the contemplated application. It is observed that for the preferred compositions of the invention, this dosage on the other hand does not much vary with the nature of the medium, and in particular not much with the chemical composition of the cements used.

Generally, for a cement composition, an admixture dosage from 0.01 to 2%, preferably from 0.05 to 1% and most particularly from 0.1 to 0.5% by weight of polymer based on the weight of the cement is suitable for most standard applications.

As an indication, an efficient admixture dosage for preparing a ready-to-use concrete composition is from 0.7 to 1.5% of a formulation of 20% by weight of dry extract based on the cement weight.

The introduction of anti-oxidant groups gives the possibility of preserving the dispersing effect of polyalkoxylated carboxylic polymers, notably by preventing thermal degradation of the polyoxyalkylated side chains.

The combined presence, in the polymers with the anti-oxidant groups according to the invention, of long polyoxyalkylated chains having a dispersion effect and of anti-oxidant groups having capability of suppressing or slowing down the oxidation is assumed to be the reason for the interesting properties of these polymers.

The polymers including described anti-oxidant groups are therefore particularly of interest as a plasticizer of suspensions of mineral particles, notably cement compositions.

Indeed, these polymers may, because of their stability towards heat and/or oxidation, be transported, stored and mixed, including as a powder, without any degradation. In particular, it is possible to obtain the transport classification for these compounds.

The polymers according to the invention are soluble and therefore easily formulated as a solution, notably an aqueous solution, and have low viscosity, which avoids problems of segregation, sedimentation or flocculation observed with emulsions and therefore ensures easy storage and easy use.

Because of their stability towards heat and oxidation, the polymers according to the invention may be incorporated into compositions based on a hydraulic binder, notably cements even before milling, without any heat degradation during the process, in order to give them specific properties (prefluidified cements, stability of cements during storage, decrease in the water demand of cements). Preparing a mixture as a powder, with a hydraulic binder, may thus be contemplated in order to produce an organo-mineral powder easy to apply and stable during storage.

Moreover, the polymer according to the invention, as this was demonstrated, gives the expected fluidifying effect and mechanical properties at the same level as for comparable non-stabilized polymers.

The invention will be better explained with reference to the examples and to the figures which follow, given as non-limiting.

SHORT DESCRIPTION OF THE FIGURES

Figure 2:
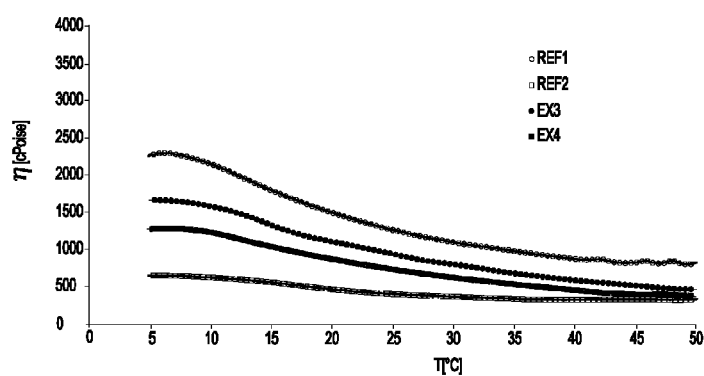
Figure 3:
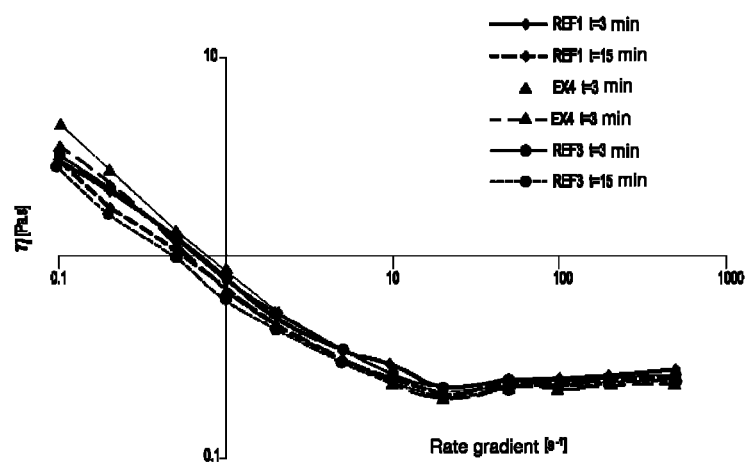
Figure 4:
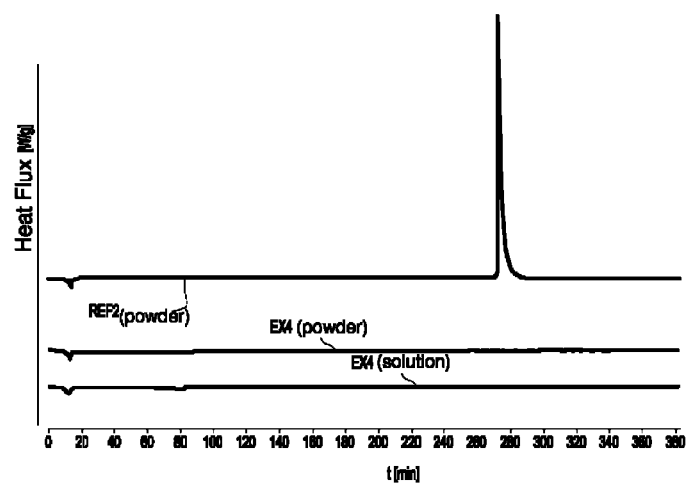

The appended figures show:

FIG. 1: a differential scanning calorimetry curve (DSC) of a polymer, the arrow indicating the induction time;

FIG. 2: the viscosity versus temperature of solutions of PCP polymers according to Examples 3 and 4 and according to Reference Examples 1 and 2;

FIG. 3: viscosity versus the rate gradient of a formulation of self-smoothing coating with as an admixture, a PCP polymer according to Example 4 and according to Reference Example 1 and 3; and FIG. 4: a differential scanning calorimetry curve (DSC) of the polymer of Example 4, as a powder and as a solution, and of the polymer of Reference Example 2 as a powder.

EXAMPLES

Reference Example 1

PCP Polymer without any Anti-Oxidant Agent

Into a heated four-neck flask, provided with a stirrer and connected to a water pump, 100 g of polymethacrylic acid in a 30% aqueous solution are introduced and then 0.64 g of a 50% by weight sodium hydroxide aqueous solution. Into the medium were then introduced 68.9 g (5.6% molar of the carboxylic functions of polymethacrylic acid) of methoxylated poly(ethylene oxide) with a weight average molar mass Mw=3,800. The reaction mixture was brought to a temperature of 80° C. At this stage, the medium is limpid. A vacuum is gradually applied to the whole down to a pressure of about 50 mbars and the temperature of the reaction medium is then gradually brought to 175° C.

The reaction is continued for a period of 2 hours counted from the moment when the reaction medium attained 170-175° C. at a pressure of 50 mbars. The progression of the esterification reaction is monitored by dosage of unreacted MPEG by GPC, by comparing the area of the peak with a calibration curve established beforehand.

At the end of the reaction, the reaction medium is brought back to atmospheric pressure and heating is cut off. At this stage, the presence of insoluble particles is visible. Once the temperature of the reaction medium is less than 90° C., the molten polymer is diluted to 50% by weight in water and then neutralized to pH 6.5 by means of a sodium hydroxide solution and brought back to 40% of dry extract.

Reference Example 2

PCP Polymer Mixed with an Anti-Oxidant Agent (Emulsion)

The polymer in solution and neutralized to pH 6.5 obtained in Reference Example 1 is mixed with 0.35% by weight, based on dry weight of polymer, of ADDITIN® RC7135 (mixture of diphenylamine derivatives marketed by Rhein Chemie, Germany) and then diluted to 35%. An emulsion is obtained.

Reference Example 3

PCP Polymer Mixed with an Anti-Oxidant Agent (Solution)

The polymer in solution and neutralized to pH 6.5 obtained in Reference Example 1 is mixed with 2% by weight of 4-aminodiphenyl amine (CAS No. 101-54-2) based on the dry weight of polymer. A solution is obtained containing a few insolubles.

Example 1

Polymer Grafted with an Anti-Oxidant Agent

Into a heated four-neck flask, provided with a stirrer and connected to a water pump, 100 g of polymethacrylic acid in a 30% aqueous solution are introduced and then 0.64 g of a 50% by weight sodium hydroxide aqueous solution. Into the medium, were then introduced 68.9 g (5.6 molar of the carboxylic functions of polymethacrylic acid) of methoxylated poly(ethylene oxide) with a weight average molar mass Mw=3,800. The reaction mixture was then brought to a temperature of 80° C. At this stage, the medium is limpid. 0.5 g of 4-aminodiphenylamine, i.e. 0.5% by weight based on the weight of dry polymer, are introduced into the reactor and very rapidly pass into the solution. A vacuum is gradually applied until a pressure of about 50 mbars is attained. At the end of the distillation of ⅔rds of the water, the medium is brought back to atmospheric pressure. The temperature of the reaction medium is then gradually brought to 175° C. while continuing distillation of the water. At 170-175° C., vacuum is re-applied gradually until a pressure of about 50 mbars is attained.

The reaction was continued for a period of 2 hours counted from the moment when the reaction medium attained 170-175° C. at a pressure of 50 mbars. The progression of the esterification reaction is monitored by dosage of unreacted MPEG, by GPC, by comparing the area of the peak with a calibration curve established beforehand.

At the end of the reaction, the reaction medium is brought back to atmospheric pressure and the heating is cut off. No formation of insoluble grains is visible at this stage.

Once the temperature of the reaction medium is less than 90° C., the molten polymer is diluted to 50% by weight in water and then neutralized to pH 6.5 by means of a sodium hydroxide solution and reduced to 40% of dry extract. The obtained polymer solution is limpid with no insoluble.

Examples 2-4

Polymer Grafted with an Anti-Oxidant Agent (Variation of the Grafting Level)

Example 1 is repeated according to the same operating procedure except for replacement of the amount of amine introduced as an anti-oxidant agent as indicated in Table 1 below. The obtained polymer solutions are limpid with no insoluble.

The 4-aminodiphenylamine content in the polymer solutions was measured by means of the following test:
1) Diluting a known amount of product in 200 mL of water.
2) Adjusting the pH of the aqueous solution to a value of 9.
3) Triple extraction with 300 mL of ethyl acetate respectively.
4) Collecting the organic phases and washing with 2×200 mL of water.
5) Evaporation of the solvent in the rotavapor.
6) Taking up the solid residue in 100 g of ethanol and dosage with HPLC by means of a preliminary calibration.

The residual 4-aminodiphenylamine content of the polymer solution of Example 4, thereby measured, is 0.02% by weight based on the weight of dry polymer. Taking into account the fact that the initial amine content was 2% based on the weight of dried polymer, this result demonstrates a quasi complete reaction of the amine.

Moreover, it is seen that the residual amine content does not vary for different pHs (extraction pH of 9 and 13), which backs up the assumption of a covalent bond established from the amine to the polymer.

TABLE 1

Grafting level of anti-oxidant agent

| EXAMPLE | Amount of anti-oxidant agent [g] | Grafting level [molar %*] | Grafting level [% by weight**] |
|---|---|---|---|
| 1 | 0.5 | 0.80 | 0.50 |
| 2 | 0.75 | 1.30 | 0.75 |
| 3 | 1 | 1.70 | 1 |
| 4 | 2 | 3.30 | 2 |
| Ref. 1 | — | — | — |
| Ref. 2 | 0.35 | — | — |
| Ref. 3 | 2.0 | — | — |

*carboxylic functions
**based on the weight of dry polymer

A. Evaluation of the Thermal Stability

The thermal stability of the polymers obtained according to the Examples was evaluated by means of differential scanning calorimetry (DSC) in air and compared with that of the polymer of Reference Example 1. The same test was carried out for evaluating the thermal stability of polymers in the form of a powder.

The powders of the polymers were prepared by atomization of an aqueous solution of the polymer according to Example 4 and to Reference Example 2 (PCP mixed with an anti-oxidant agent in an emulsion), respectively.

The polymer samples from the solution were prepared by depositing the polymer solution as a film on a glass plate and then drying it in an oven. The dry film of polymer was then removed from the plate by scraping and then introduced into cups specific to differential calorimetry.

Differential calorimetry is then carried out under the following conditions:
Rise from 25° C. to 190° C.-2° C. per minute and maintaining 190° C. for 5 hours.
Air flow rate: 60 ml/min As an indicator of thermal stability, on the differential calorimetric curve, the elapsed time is measured before the exothermic decomposition peak appears, a so-called induction time, indicated by the arrow in FIG. 1.

TABLE 2

Thermal stability at 190° C.

| EXAMPLE | Induction time [min] | Variation of the induction time [%] |
|---|---|---|
| Ref. 1 | 60 | 0 |
| Ref. 2 | 285 | 375 |
| Ref. 2 (powder) | 272 | 353 |
| EX. 1 | 110 | 83 |
| EX. 2 | 170 | 183 |
| EX. 3 | 215 | 258 |
| EX. 4 | >380 | >533 |
| EX. 4 (powder) | >380 | >533 |

The results of these tests for the studied polymers are grouped in Table 2 above.

First of all, it is seen that the induction time of the polymers is substantially prolonged in the presence of anti-oxidant compounds. More specifically, it is seen that the thermal stability of PCP polymers increases with the grafting level of anti-oxidant agent (Examples 1 to 4) as compared with the same PCP which does not contain any anti-oxidant agent (Reference Example 1). In fact, the variation of the induction time is very well correlated with the grafting level, which may be explained by a good distribution of the anti-oxidant agent on the polymer.

Moreover, it is seen that the PCP polymer obtained in example 4 gives better stability than Reference Example 2, which includes the polymer and the anti-oxidant agent in the form of an emulsion.

These results also confirm that the stability of the PCP polymers grafted according to the invention is not affected when they are powdered (see Example 4 and Example 4 with a powder)

The curve collected for the polymer of Example 4, in the form of a solution and of a powder and of the polymer of Reference Example 2 in the form of a powder is illustrated in FIG. 4. It is seen that the curve obtained for the powder of the polymer of Reference Example 2 shows an exothermic peak, interpreted as an induction time while this peak is absent from the recorded curves for the polymer according to the invention, whether it is in the form of a powder or a solution.

B. Viscosity

The viscosity of the polymers in solution, an important parameter since it in particular conditions the ease of dosage, was evaluated versus temperature as follows.

The polymer solution was deposited on the plane of a rheometer with a heating resistor (BOHLIN INSTRUMENT—CVO 100) and viscosity was then measured at different temperatures by means of a cone.

FIG. 2 illustrates the viscosity curves obtained for the polymers according to the invention and according to the Reference Examples, under identical conditions, i.e. neutralized to pH 6.5 and with 40% of dry content in solution respectively.

The results show that the polymer solutions obtained according to Examples 3 and 4 have a lower viscosity than the polymer solution according to Reference Example 1, without any anti-oxidant agent.

C. Evaluation of the Application Performances

In order to evaluate the application performances of the polymers according to the invention, self-spreading, viscosity, setting time and mechanical strengths of a formulation of self-smoothing coating with as an admixture the polymers according to the invention and with reference polymers respectively were evaluated.

The self-smoothing coating formulation used for the evaluation, without any polymer, is detailed in Table 3 below. The operating procedure used is the following:

480 g of tap water are weighed in the metal tank of a Turbotest Rayneri (VMI Rayneri) mixer provided with a ½-anchor blade and then, under stirring at 240 rpm, the dry components mixed beforehand are added within 20 seconds. The moment when the dry components are added is the initial point for measuring time. The whole is kneaded under stirring at 800 rpm for 2 minutes.

The PCP polymer is added to the formulation in the dosage indicated in Table 4 below, to the dry components if it is a powder, or otherwise to the mixing water.

TABLE 3

Formulation of the self-smoothing coating

| Component | Amount [% by weight] |
| --- | --- |
| Aluminous cement | 20 |
| Calcium sulfate | 10 |
| Calcium carbonate | 17.62 |
| Calcium carbonate | 15.73 |
| Siliceous sand | 34.56 |
| Redispersable resin | 1.5 |
| Lithium carbonate | 0.05 |
| Tartaric acid | 0.14 |
| Cellulose ether | 0.1 |
| Anti-foam agent | 0.1 |
| W/C | 24% |

C.1. Self-Smoothing

Self-smoothing of the formulation of prepared coating as indicated above is measured according to the following procedure.

After preparing the coating according to the operating procedure indicated above, a spreading cone is laid at the center of a glass plate and the cone is then filled to the brim at due times, 3, 7 and 20 minutes after the beginning of the kneading.

The cone is then lifted up delicately to the vertical and drained off for a few instants before measuring the spreading over 3 diagonals after stabilization of the flow (after about 3 mins). The average of the 3 measurements is retained as a result (result expressed in mm). If required, any particularity of the spreading, of the aspect of the mortar in the bowl, is observed (e.g.: penetration, segregation).

The results obtained for the formulations of coatings with polymer admixture according to Example 4 and with reference polymers 1 and 3 at a dosage of 0.2% and 0.05% are grouped in Table 4 below.

TABLE 4

Self-spreading of a coating formulated with addition of a PCP polymer

| EXAMPLE | Dosage * | Self-spreading | | | | |
| --- | --- | --- | --- | --- | --- | --- |
| | | 3 mins | 7 mins | 15 mins | 20 mins | 25 mins |
| Ref 1 | 0.2 | 155 | 160 | 160 | 160 | 160 |
| Ref 3 | 0.2 | 160 | 160 | 160 | 160 | 160 |
| EX 4 | 0.2 | 160 | 160 | 162 | 160 | 160 |
| Ref 1 | 0.05 | 160 | 155 | 155 | 155 | 145 |

TABLE 4-continued

Self-spreading of a coating formulated with addition of a PCP polymer

| EXAMPLE | Dosage * | Self-spreading | | | | |
| --- | --- | --- | --- | --- | --- | --- |
| | | 3 mins | 7 mins | 15 mins | 20 mins | 25 mins |
| Ref 3 | 0.05 | 150 | 150 | 150 | 150 | 145 |
| EX 4 | 0.05 | 158 | 160 | 160 | 150 | 150 |

* in % by weight based on the total dry material.

It is seen that the self-spreading values at a dosage of 0.2% are equivalent and remain stable for 25 minutes for the reference polymer 1 (polymer without any anti-oxidant agent) and the polymer according to Example 4. These results indicated that grafting with an anti-oxidant agent does not affect the performances in terms of self-spreading.

Equivalent performances with the polymer according to the invention are also observed at a dosage of 0.05%, as compared with the polymer according to Reference Example 3 (polymer added with anti-oxidant agent).

The results concerning the coatings prepared with the polymer according to the invention as a powder are collected together in Table 5 below. It is seen that the obtained powder from the grafted polymer does not affect the self-spreading values as compared with the powder obtained from an emulsion, the measured values being equivalent.

TABLE 5

Self-spreading of a cement coating with a PCP polymer admixture

| EXAMPLE | Dosage * | Self-spreading | | | | |
| --- | --- | --- | --- | --- | --- | --- |
| | | 3 mins | 7 mins | 15 mins | 20 mins | 25 mins |
| Reference | 0.03 | 116 | 123 | ND | 130 | ND |
| Example 2 | 0.05 | 141 | 144 | ND | 148 | ND |
| (powder) | 0.1 | 145 | 150 | ND | 152 | ND |
| | 0.2 | 148 | 150 | ND | 147 | ND |
| Example 4 | 0.03 | 107 | 126 | ND | 126 | ND |
| (powder) | 0.05 | 146 | 151 | ND | 153 | ND |
| | 0.1 | 150 | 155 | ND | 155 | ND |
| | 0.2 | 150 | 155 | ND | 157 | ND |

C.2. Viscosity of the Coating

In order to compare the effect of the polymers according to the invention on the viscosity of the coating, the viscosity was evaluated versus the shear gradient of coatings with admixture with a dosage of 0.2% according to the following procedure.

The behavior of the coatings at different steps of the practical duration of use of the mortar once it is mixed, may be described by a flow profile measurement. This type of measurements with variable rate gradients in particular gives the possibility of following the rheological behavior of the product during the hydraulic settings. Indeed, certain domains of rate gradients are directly representative of the behavior of the products during its storage, its pumping, or further of its manageability.

The rheological behavior of a self-smoothing coating with the composition indicated in Table 3 above is determined in the following way: 300 g of self-smoothing mortar are mixed with the rated water level in a 0.5 L pot (d=9 cm) by means of an IKA mixer provided with an 8 cm blade for 3 minutes at 800 rpm. About 7 minutes after the beginning of the mixing, the viscosity and the stress are measured by carrying out a rate gradient scan from 0.1 to 1,000 $s^{-1}$ by means of a rheometer (Rheomat RM260, marketed by Mettler Toledo) with a cylindro-conical geometry MS DIN 145.

Before the measurement, all the samples are subject to a same mechanical stress, i.e. pre-shearing at 50 s$^{-1}$ for 10 seconds, in order to position them in a comparable structuration condition. The rate gradients are selected on a logarithmic scale, and the measurements are carried out step by step at rate gradients of 0.1, 0.2, 0.5, 1, 2, 5, 10, 20, 50, 100, 200 and 500 s$^{-1}$ and then from 500 to 0.1 s$^{-1}$ via the same measurement sequence. Further, in order to take into account the impact of the rate gradient on the time required for obtaining rheological equilibrium, longer measurement times are used for low rate gradients, in order to ensure that rheological equilibrium is reached. After preliminary evaluation, the retained measurement times are: 20 seconds for rate gradients of 0.1, 0.2 and 0.5 s$^{-1}$, 10 seconds for gradients of 1, 2 and 5 s$^{-1}$, 20 seconds for gradients of 10, 20 and 50 s$^{-1}$, and 5 seconds for gradients of 100, 200 and 500 s$^{-1}$.

Ten viscosity measurements are carried out for each rate gradient. The result is given by the average of these values.

The obtained results are grouped in FIG. 3. It is seen that the viscosity of the coatings formulated with a polymer without any anti-oxidant agent (Reference Example 1) is substantially equivalent to that of such a coating formulated with a polymer according to Example 4. This observation indicates that the grafting of the polymer with an anti-oxidant agent does not affect the performance of the polymer as regards viscosity.

C.3. Setting Time and Mechanical Strength

The values of setting time and the mechanical flexural and compression strength were also evaluated for the formulations of self-smoothing coating with admixture, as studied above.

The setting time was determined according to the test with the fall of a Vicat needle as described in the NF EN 196-3 standard. The results are indicated in Table 6 below.

For the purpose of determining the strength of the obtained mortar, test specimens were prepared as follows. After preparing the mortar as described above, measurement test specimens are made in metal molds with dimensions of 2×2×16 cm. The hardened test specimens are removed from the mold 2 hours before mixing and kept at 23±2° C. and 50±5% RH until the measurement times.

The 3-point flexural mechanical strength was determined according to an Ibertest press with a 3-point flexure device, for which the rise in load is set to 50N/s+/−10N/s. The test specimen is placed and centered on the device, the unformed surface is perpendicular to the supporting points. The test is then started with the following parameterization:

Section C1=20 mm Square C2=20 mm

Base length=100 mm Contact rate 5=5%

The compression strength was determined on prismatic test specimens in an Ibertest press with compression for prismatic test specimens, the strength slope was set to 2,400N/s+/−200N/s. From both half-specimens of the flexion test, the test specimen is placed and centered on the device, the unformed surface is perpendicular to the supporting plate. The test is then started with the following parameterization:

Section C1=20 mm Square C2=40 mm

Base length=100 mm Contact rate 5=15%

TABLE 6

Setting time and mechanical strength

| EXAMPLE | Setting time [min] | | Mechanical flexural strength [MPa] | | Mechanical compression strength [MPa] | |
|---|---|---|---|---|---|---|
| | Begin. | End | 2 h | 24 h | 2 h | 24 h |
| Ref 1 | 64 | 73 | 2.4 | 3.8 | 11.6 | 20.8 |
| Ref 3 | 57 | 61 | 2.9 | 4.6 | 13 | 24.2 |
| EX 4 | 71 | 79 | 2.3 | 3.8 | 11.8 | 18.8 |

The flexural and compression strength results are averaged for a same measurement due time. The respective result for the polymer according to Example 4 as compared with polymers according to Reference Example 1 (without any anti-oxidant agent) and Reference Example 3 (mixed with an anti-oxidant agent) are summarized in Table 6 above.

The setting time was also studied for formulating the self-smoothing coating prepared by using the polymer as a powder, for different dosages. The results are grouped together in Table 7 below.

TABLE 7

Setting time for different dosages

| | | Setting time [min] | |
|---|---|---|---|
| EXAMPLE | Dosage * | Beginning | End |
| Reference | 0.03 | 54 | 60 |
| Example 2 | 0.05 | 59 | 65 |
| (powder) | 0.1 | 72 | 78 |
| | 0.2 | 103 | 112 |
| Example 4 | 0.03 | 67 | 73 |
| (powder) | 0.05 | 65 | 71 |
| | 0.1 | 81 | 84 |
| | 0.2 | 100 | 106 |

The obtained results show that the grafting of the PCP polymer with an anti-oxidant agent does not notably affect the setting time or the flexural and compression strength of the hardened material. Moreover it is seen that these advantages are also obtained when the polymer according to the invention is used as a powder and this over a wide range of dosages.

The results above moreover show that the grafting does not affect the application properties such as the viscosity of the formulation, the setting time and the flexural and compression mechanical strength.

The polymers according to the invention therefore provide the possibility of having dispersing polymers with improved thermal stability at a lower cost.

C.4. Water Demand of Cements with Grafted PCP as an Admixture Before Milling

In order to evaluate the strength of the polymers according to the invention at the temperature of the cement during the milling, the water demand of milled cements in the presence of polymers according to the invention was evaluated. As a comparison, the same test was also carried out with a non-grafted polymer. A cement prepared without any polymer was used as a control.

A cement CEM I was milled by means of a heated ball milling machine after incorporating 2,000 ppm of a polymer solution, expressed in % by dry weight based on the weight of cement. The milling was carried out in a heated milling machine with Blaine fineness around 4,000 g/cm$^2$. The cement was then maintained for 3 hours at 100° C.

TABLE 8

Water demand according to EN 196-3 of a milled cement with an admixture

| EXAMPLE | W/C |
|---|---|
| Control | 0.218 |
| Ref. 1 | 0.220 |
| EX. 4 | 0.213 |

The prepared cement samples were then respectively mixed with the required amount of water for obtaining a same plasticity according to French standard EN 196-3. The ratio between the amount of water and the amount of cement is called the W/C ratio.

The results are summarized in Table 8 above. It is seen that the water demand is not affected when a non-protected PCP is added to the clinker before milling. On the other hand, when a PCP according to the invention, grafted with anti-oxidant groups, is added to the cement, it is seen that the water demand decreases, indicating the effective presence of a plasticizer. From these results it may be inferred that the grafted polymer according to the invention preserved its capability of reducing water even after having been exposed to the oxidizing medium at a high temperature for an extended time.

In fact, the polymer according to the invention gives the possibility of obtaining a cement with improved water demand (lower W/C) of about 5% for Example 4 as compared with Reference Example 1.

As a conclusion, the combined presence, in the polymers with anti-oxidant groups according to the invention, of long polyoxyalkylated chains having a plasticizing effect, and of anti-oxidant groups having a capability of suppressing or slowing down the oxidation of oxidizing agents seems to be at the origin of the particular properties of the polymer according to the invention. These polymers including described anti-oxidant groups are therefore particularly of interest as a plasticizer of hydraulic compositions notably cement compositions.

Because of their stability towards heat and oxidation, the polymers according to the invention may be incorporated into compositions based on a hydraulic binder, notably cements even before milling, without any thermal degradation during the process, in order to give them specific properties (prefluidified cements, stability of the cements during storage, decrease in the water demand of the cements). Preparing a mixture as a powder with a hydraulic binder may thus be contemplated in order to propose an organomineral powder easy to apply and stable during storage.

Moreover they are soluble and may therefore be easily formulated as a solution, notably as an aqueous solution, which avoids problems of segregation, sedimentation or flocculation observed with emulsions. The solutions are limpid, stable and not very viscous and allow easy storage and ease of use.

The solubility of water and the heat and oxidation resistance facilitate the transformation of the polymers according to the invention, since the powdering may be achieved in an easy and economical way, notably by atomization in air and therefore without requiring them to set under an inert gas of the atomization tower.

Because of their stability towards heat and/or oxidation, these polymers may further be transported, stored and mixed, including as a powder, without any risk. In particular, it is possible to obtain transport classification for these compounds.

Moreover, the polymers according to the invention, as this has been demonstrated, impart the expected fluidifying effect and mechanical properties at the same level as that of comparable non-stabilized polymers.

C.5. Comparison of the Spreading of Non-Grafted and Grafted PCPs

In order to demonstrate the stabilizing effect of the grafting with anti-oxidant groups, a cement before milling received an admixture with a PCP or a same grafted PCP and then the performances of mortars prepared from these cements were compared.

Reference Example A

Polymer not Grafted with an Anti-Oxidant Agent

Into a four-neck flask, provided with a stirrer and connected to a water pump, 241.49 g of polymethacrylic acid in a 30% aqueous solution and then 1.64 g a 50% by weight sodium hydroxide aqueous solution were introduced. In the medium, were then introduced 758.2 g of methoxypolyethylene glycol with a weight average molar mass Mw=5,000. The reaction mixture was brought to a temperature of 80° C. At this stage, the medium is limpid. A vacuum is gradually applied to the whole until a pressure is obtained of about 50 mbars and the temperature of the reaction medium is then gradually brought to 165° C.

The reaction was continued for a period of 4 hours counted from the moment when the reaction medium attained 160-165° C. at a pressure of 50 mbars. The progress of the esterification reaction is followed by the dosage of unreacted MPEG, by GPC, by comparing the area of the peak with a calibration curve established beforehand. The reaction is stopped when the residual MPEG level represents less than 2% of the reaction mass.

At the end of the reaction, the reaction medium is brought back to atmospheric pressure and heating is cut off. Once the temperature of the reaction medium is less than 90° C., the molten polymer is diluted to 50% with 637.9 g of water. 300.2 g of polymer solution are diluted with 321.3 g of water and the pH is then brought to 6.5 with 4.51 g of 50% sodium hydroxide solution. The final extract is at 25.1%.

Reference Example B

Polymer not Grafted with an Anti-Oxidant Agent

In a jacketed glass reactor, provided with a stirrer and connected to a vacuum pump, 1,761.8 g of polymethacrylic acid in a 30% aqueous solution followed by 11.15 g of a 50% by mass sodium hydroxide aqueous solution are introduced. Into the medium, were then introduced 2,230.1 g of methoxypolyethylene glycol with a weight average molar mass Mw=2,000. The reaction mixture was then brought to a temperature of 80° C. At this stage, the medium is limpid. Vacuum is gradually applied to the whole down to a pressure of about 50 mbars and the temperature of the reaction medium is then gradually brought to 165° C.

The reaction was continued for a period of 4 hours counted from the moment when the reaction medium attains 160-165° C. at a pressure of 50 mbars. The progress of the esterification reaction is followed by dosage of unreacted MPEG, by GPC, by comparing the area of the peak with a calibration curve established beforehand. The reaction is stopped when the residual MPEG level represents less than 2% of the reaction mass.

At the end of the reaction, the reaction medium is brought back to atmospheric pressure and the heating is cut off. Once the temperature of the reaction medium is less than 90° C., the molten polymer is diluted to 50% with 2,553 g of water, 340.1 g of polymer solution are diluted with 362.3 g of water and the pH is then brought to 6.5 with 10.2 g of 50% sodium hydroxide solution. The final extract is at 21.9%.

Example A

Polymer of Reference Example A Crafted with an Anti-Oxidant Agent

Into a four-neck flask, provided with a stirrer and connected to a water pump, 241.49 g of polymethacrylic acid in a 30% aqueous solution and then 1.64 g of a 50% by weight sodium hydroxide aqueous solution were introduced. In the medium, were then introduced 758.2 g of methoxypolyethylene glycol with a weight average molar mass Mw=5,000. The reaction mixture was brought to a temperature of 80° C. At this stage, the medium is limpid. 16.7 grams of 4-aminodiphenylamine, i.e. 2% by weight based on the weight of dry polymer, are introduced into the reactor and very rapidly pass into the solution. A vacuum is gradually applied to the whole down to a pressure of about 50 mbars and the temperature of the reaction medium is then gradually brought to 165° C.

The reaction was then continued for a period of 4 hours counted from the moment when the reaction medium attained 160-165° C. at a pressure of 50 mbars. The progress of the esterification reaction is followed by the dosage of unreacted MPEG, by GPC, by comparing the area of the peak with a calibration curve established beforehand. The reaction is stopped when the residual MPEG level represents less than 2% of the reaction mass.

At the end of the reaction, the reaction medium is brought back to atmospheric pressure and heating is cut off. Once the temperature of the reaction medium is less than 90° C., the molten polymer is diluted to 50% with 632.6 g of water. 340.1 g of polymer solution are diluted with 362.3 g of water and the pH is then brought to 6.5 with 3.02 g of a 50% sodium hydroxide solution. The final extract is at 21.7%.

Example B

Polymer of Reference Example B Grafted with an Anti-Oxidant Agent

Into a jacketed glass reactor, provided with a stirrer and connected to a vacuum pump, 1761.8 g of polymethacrylic acid in a 30% aqueous solution followed by 11.15 g of a 50% by mass sodium hydroxide aqueous solution were introduced. Into the medium, were then introduced 2,230.1 g of methoxypolyethylene glycol with a weight average molar mass Mw=2,000. The reaction mixture was brought to a temperature of 80° C. At this stage, the medium is limpid. 54.8 g of 4-aminodiphenylamine, i.e. 2% by weight based on the weight of dried polymer, are introduced into the reactor and very rapidly pass into the solution. A vacuum is gradually applied to the whole down to a pressure of about 50 mbars and the temperature of the reaction medium is then gradually brought to 165° C.

The reaction was continued for a period of 4 hours counted from the moment when the reaction medium attains 160-165° C. at a pressure of 50 mbars. The progression of the esterification reaction is followed by dosage of unreacted MPEG, by GPC, by comparing the area of the peak with a calibration curve established beforehand. The reaction is stopped when the residual MPEG level represents less than 2% of the reaction mass.

At the end of the reaction, the reaction medium is brought back to atmospheric pressure and the heating is cut off. 19.4 g of this anhydrous polymer are diluted in 71.5 g of water and the pH is then brought to 6.5 with 1.1 g of a 50% sodium hydroxide solution. The final extract is at 21.7%.

Milling of the Cement

A cement CEM I consisting of 95% by mass of clinker and of 5% of gypsum was milled by means of a heated ball mill after incorporating 1,200 ppm of polymer solution, expressed in dry mass % based on the cement weight, to the materials before milling. The milling as carried out at 105° C. by adjusting the number of revolutions in order to obtain Blaine fineness close to 3,500 g/cm$^2$. 5 kg of material are milled in each operation, the milling load, consisting of balls with a diameter from 13 to 30 mm, is 60 kg. The Blaine fineness is measured according to the EN 196-6 standard. The fluidifying power, also called water reducing power, of the polymer subject to milling is measured on a mortar prepared according to the operating procedure described on page 12 of the Lafarge patent WO2011015761. The spreading is measured for 5 mins after preparing the mortar according to the EN1015-3 standard <<Determination of the consistency of a fresh mortar with a vibrating table>>: the wider the spreading, the greater the fluidifying power of the polymer.

Table 9 below groups the evaluations which were carried out:

TABLE 9

Evaluation of the spreading for non-grafted polymers and polymers grafted with anti-oxidant groups

| | Reference example A | Example A | Reference example B | Example B |
| --- | --- | --- | --- | --- |
| Blaine fineness (cm$^2$/g) | 3422 | 3492 | 3547 | 3528 |
| Total number of revolutions | 1700 | 1800 | 1600 | 1600 |
| T5 spreading (mm) | 205 | 260 | 230 | 265 |

The results show that the spreading is significantly greater for polymers grafted with an anti-oxidant group, according to the invention, as compared with polymers of equivalent structure but without any anti-oxidant.

These results demonstrate a favorable effect due to the grafted anti-oxidant, and may be related to a protective effect of anti-oxidant groups, giving the possibility of avoiding degradation of the polymer.

The invention claimed is:

1. A polymer comprising a main hydrocarbon chain bearing carboxylic groups and polyalkoxylated chains, and comprising 0.01 to 4% by weight, based on the weight of the final polymer, of antioxidant groups grafted to the main chain.

2. The polymer according to claim 1, comprising between 0.1 and 4% by weight of antioxidant groups, based on the weight of the polymer.

3. The polymer according to claim 1, wherein the antioxidant groups comprise an aromatic amine.

4. The polymer according to claim 1, wherein the antioxidant group stems from a compound of the following formula (I):

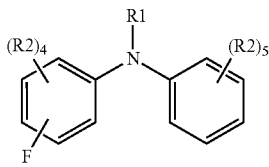

wherein:
R1 is a hydrogen or a saturated or unsaturated, linear or branched hydrocarbon chain or one or more aromatic optionally fused rings, comprising from 1 to 100 carbon atoms optionally interrupted with one or more heteroatoms;
R2 is identical or different and may independently of each other, be a hydrogen or a saturated or unsaturated, linear or branched hydrocarbon chain, or one or more aromatic optionally fused rings, comprising from 1 to 100 carbon atoms, optionally interrupted with one or more heteroatoms, and/or optionally substituted with one or more amine, alcohol, ketone, halogenated derivative, isocyanate, acetoacetonate, silanol, carboxylic acid and alcohol ester, epoxide, carbonate or mercaptan, phosphate, phosphonate, sulfate, sulfonate or carboxylate groups;
F is an amine group, an alcohol, ketone, halogenated derivative, isocyanate, acetoacetonate, silanol, carboxylic acid and alcohol ester, epoxide, carbonate or mercaptan group bound to the aromatic ring optionally through a saturated or unsaturated, linear or branched hydrocarbon chain comprising up to 100 carbon atoms.

5. The polymer according to claim 4, wherein said heteroatom is O, S, N or P.

6. The polymer according to claim 4, wherein R1 is hydrogen.

7. The polymer according to claim 4, wherein said heteroatom is O, S, N or P.

8. The polymer according to claim 4, wherein R2 is hydrogen.

9. The polymer according to claim 4, wherein the amine group is a primary amine group.

10. The polymer according to claim 1, wherein the antioxidant group is grafted to the main chain via a carboxylic group, by means of an amide or ester bond.

11. The polymer according to claim 1, wherein the polymer has a weight average molar mass of between 1,000 and 1,000,000 (Mw).

12. The polymer according to claim 1, as a powder.

13. A method for preparing a polymer according to claim 1, comprising the step of:
(i) esterifying a polycarboxylic compound with an alkoxy polyalkoxyglycol in the presence of an antioxidant compound, which may react under conditions of the reaction with a reactive function born by the polycarboxylic compound in order to form a covalent bond between the polycarboxylic compound and the antioxidant compound.

14. The method according to claim 13, wherein the step (i) is carried out in two distinct steps:
(a) the reaction mixture is first brought to a temperature comprised between 50 and 95° C. and under reduced pressure;
(b) the reaction is then continued by heating to a temperature comprised between 100 and 200° C. under reduced pressure and/or under a flow of inert gas until the end of the reaction.

15. The method according to claim 13, further comprising a step for powdering the obtained grafted polymer.

16. The method according to claim 15, wherein the powdering step is directly carried out from the polymer stemming from step (b).

17. The method according to claim 15, wherein the powdering step comprises the steps of:
putting the obtained grafted polymer in an aqueous solution; and
powdering the obtained polymer solution, notably by atomization, flaking through a thin film on a drum or milling.

18. A polymer obtainable by the method according to claim 13.

19. A method of plasticizing a suspensions of mineral particles comprising adding to said suspension of mineral particles an admixture comprising the polymer according to claim 1.

20. The method according to claim 19, wherein the admixture is a limpid aqueous solution.

21. The method according to claim 20, wherein the admixture comprises from 10 to 50% by weight of the polymer.

22. A method of fluidifying a suspension of particles comprising adding to the suspension of particles a polymer according to claim 1.

23. A method of reducing water demand of a hydraulic composition comprising adding to said hydraulic composition a polymer according to claim 1.

24. The method according to claim 23, wherein the polymer is added in liquid form and/or as a powder before and/or during milling of a cement.

25. The polymer according to claim 1, wherein the polymer has a weight average molar mass of between 5,000 and 110,000 (Mw).

* * * * *